United States Patent
Johansson et al.

(10) Patent No.: US 9,078,395 B2
(45) Date of Patent: Jul. 14, 2015

(54) FOLDING ARRANGEMENT FOR A HANDLE ASSEMBLY OF A WALK-BEHIND POWER TOOL

(75) Inventors: Jörgen Johansson, Jönköping (SE); Helena André, Bankeryd (SE); Kent Ludwigsson, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/354,572

(22) PCT Filed: Oct. 27, 2011

(86) PCT No.: PCT/SE2011/051282
§ 371 (c)(1),
(2), (4) Date: Jun. 10, 2014

(87) PCT Pub. No.: WO2013/062458
PCT Pub. Date: May 2, 2013

(65) Prior Publication Data
US 2015/0150192 A1    Jun. 4, 2015

(51) Int. Cl.
*B62D 51/00* (2006.01)
*A01D 34/82* (2006.01)

(52) U.S. Cl.
CPC .................... *A01D 34/824* (2013.01)

(58) Field of Classification Search
CPC ........ A01B 33/028; A01B 5/067; A01B 9/20; A01D 2034/6863; A01D 2101/00; A01D 34/006; A01D 34/62; A01D 34/822; A01D 34/824; B62B 5/067; B62B 9/20
USPC ........ 16/437, 436, 113.1, 429, 426, 900, 386, 16/387, 223; 15/410, 411; 56/10.8, 14.8, 56/11.1, 11.3, 16.7, 2, DIG. 18; 180/19.3, 180/332, 333, 336; 172/42, 43; 280/47.371
See application file for complete search history.

(56) References Cited

U.S. PATENT DOCUMENTS

| | | | | |
|---|---|---|---|---|
| 4,666,328 A * | 5/1987 | Ryu | ................................ | 403/92 |
| 5,735,064 A * | 4/1998 | Holl | ................................. | 37/260 |
| 6,101,678 A * | 8/2000 | Malloy et al. | ................... | 16/438 |
| 7,496,990 B2 * | 3/2009 | Qiao | ............................... | 16/437 |
| 7,717,565 B2 * | 5/2010 | Miyazawa et al. | .............. | 353/31 |
| 8,505,169 B2 * | 8/2013 | Wood et al. | ..................... | 16/387 |

(Continued)

FOREIGN PATENT DOCUMENTS

DE    102004020985 A1 * 11/2005
FR    2765545 A1 *  1/1999
(Continued)

*Primary Examiner* — Chuck Mah
(74) *Attorney, Agent, or Firm* — Nelson Mullins Riley & Scarborough LLP

(57) ABSTRACT

A folding arrangement of a walk-behind power tool includes a hinge having a first hinge part and a second hinge part pivotally interconnected about a hinge axis, so as to enable pivoting of the hinge between a folded position and a closed position. The first hinge part has a first opening for passing through a cable harness. The second hinge part has a second opening for receiving the cable harness. The first and second openings are facing each other when the hinge is in the closed position. At least one of the first and second hinge parts has a protruding portion for directing the cable harness towards the first and second opening when the hinge pivots from the folded position to the closed position.

20 Claims, 2 Drawing Sheets

(56) References Cited

U.S. PATENT DOCUMENTS

| | | | |
|---|---|---|---|
| 2002/0112320 A1* | 8/2002 | Hayashi | 16/386 |
| 2006/0053762 A1* | 3/2006 | Stover et al. | 56/16.7 |
| 2010/0220442 A1* | 9/2010 | Griffin | 361/679.56 |
| 2011/0126502 A1* | 6/2011 | Pitman et al. | 56/10.8 |
| 2014/0102068 A1* | 4/2014 | Zhang | 56/16.7 |

FOREIGN PATENT DOCUMENTS

| | | | | |
|---|---|---|---|---|
| FR | 2768300 A1 | * | 3/1999 | |
| GB | 846853 A | * | 8/1960 | |
| GB | 2288863 A | * | 11/1995 | F16L 7/00 |
| WO | WO 9847753 A1 | * | 10/1998 | B62B 9/20 |

\* cited by examiner

FOLDING ARRANGEMENT FOR A HANDLE ASSEMBLY OF A WALK-BEHIND POWER TOOL

TECHNICAL FIELD

The present invention relates to a folding arrangement of a walk-behind power tool. More particularly, it relates to a folding arrangement for a handle assembly of the walk-behind power tool.

BACKGROUND

Walk-behind power tools, such as, lawn mowers, snow throwers, dethatchers, aerators, sod cutters, or the like are well known in the art. Typically, a walk-behind power tool includes a handle assembly attached to the rear of a tool body. Further, various control members, such as, switches, levers, triggers etc., are located at an upper portion of the handle assembly to enable a user to conveniently operate the walk-behind power tool. Typically, one or more cables are provided to connect the control members with corresponding actuators (E.g., valves, switches) in the tool body.

However, the cables may be vulnerable to mechanical damage and hostile environmental conditions. Further, a loose portion of the cable may get entangled with any object and interfere with an operation of the walk-behind power tool. To prevent this, the cables are required to be enclosed at least partially within one or more handle members of the handle assembly.

Moreover, the handle assembly along with the tool body may occupy a substantial amount of space and pose a problem during storage and/or transport of the walk-behind power tool. Some prior art walk-behind power tools include a folding arrangement for the handle assembly such that the handle assembly may be folded in a storage or a transport position. However, in case the cables are enclosed at least partially within one or handle members, the folding and unfolding of the handle assembly may cause undesirable bending and entanglement of the cables with the one or more handle members. This may cause damage to the cables and cause inconvenience to the user.

Therefore there is a need for an improved folding arrangement for a handle assembly of a walk-behind power tool that overcomes the aforementioned problems.

SUMMARY

In view of the above, it is an objective to solve or at least reduce the problems discussed above. In particular, an objective is to provide an improved folding arrangement for a walk-behind power tool.

The objective is achieved with a novel folding arrangement of a walk-behind power tool according to claim 1. The folding arrangement includes a hinge having a first hinge part and a second hinge part. The first hinge part is arranged for receiving an end of a first elongate member, while the second hinge part is arranged for receiving an end of a second elongate member. Further, the first and second hinge parts are pivotally interconnected about a hinge axis, so as to enable pivoting of the hinge between a folded position and a closed position. Moreover, the first hinge part has a first opening arranged for passing through a cable harness arriving from a channel or groove provided in the first elongate member. Similarly, the second hinge part has a second opening arranged for receiving the cable harness arriving from the first opening. The first and second openings face each other when the hinge is in the closed position. Further, at least one of the first and second hinge parts has a protruding portion, arranged for directing the cable harness towards the first and second openings when the hinge pivots from the folded position to the closed position. Thus, the protruding portion substantially prevents undesired deformation and entanglement of the cable harness between the first hinge part and the second hinge part. This also prevents any damage to the cable harness during pivoting of the hinge, thereby resulting in smooth operation of the hinge. Therefore, the hinge enables the use of the folding arrangement in addition to having the cable harness at least partially enclosed within at least the first elongate member and the second elongate member.

According to claim 2, the protruding portion is arranged at the periphery of the first opening of the first hinge part. Additionally, according to claim 3, a second protruding portion is arranged at the periphery of the second opening of the second hinge part.

According to claim 4, the folding arrangement further includes a flexible tubular cable harness protection means which is arranged to extend between the first opening and the second opening. Moreover, according to claim 5, the flexible tubular cable harness protection means is a coil spring. The protection means may safeguard the cable harness against mechanical damage, exposure to detrimental environmental elements, or the like.

According to claim 6, a handle assembly includes at least one folding arrangement. Further, according to claim 7, a walk-behind power tool includes the handle assembly.

BRIEF DESCRIPTION OF THE DRAWINGS

The invention will be described in more detail with reference to the enclosed drawings, wherein.

DESCRIPTION OF EMBODIMENTS

Figure 1:
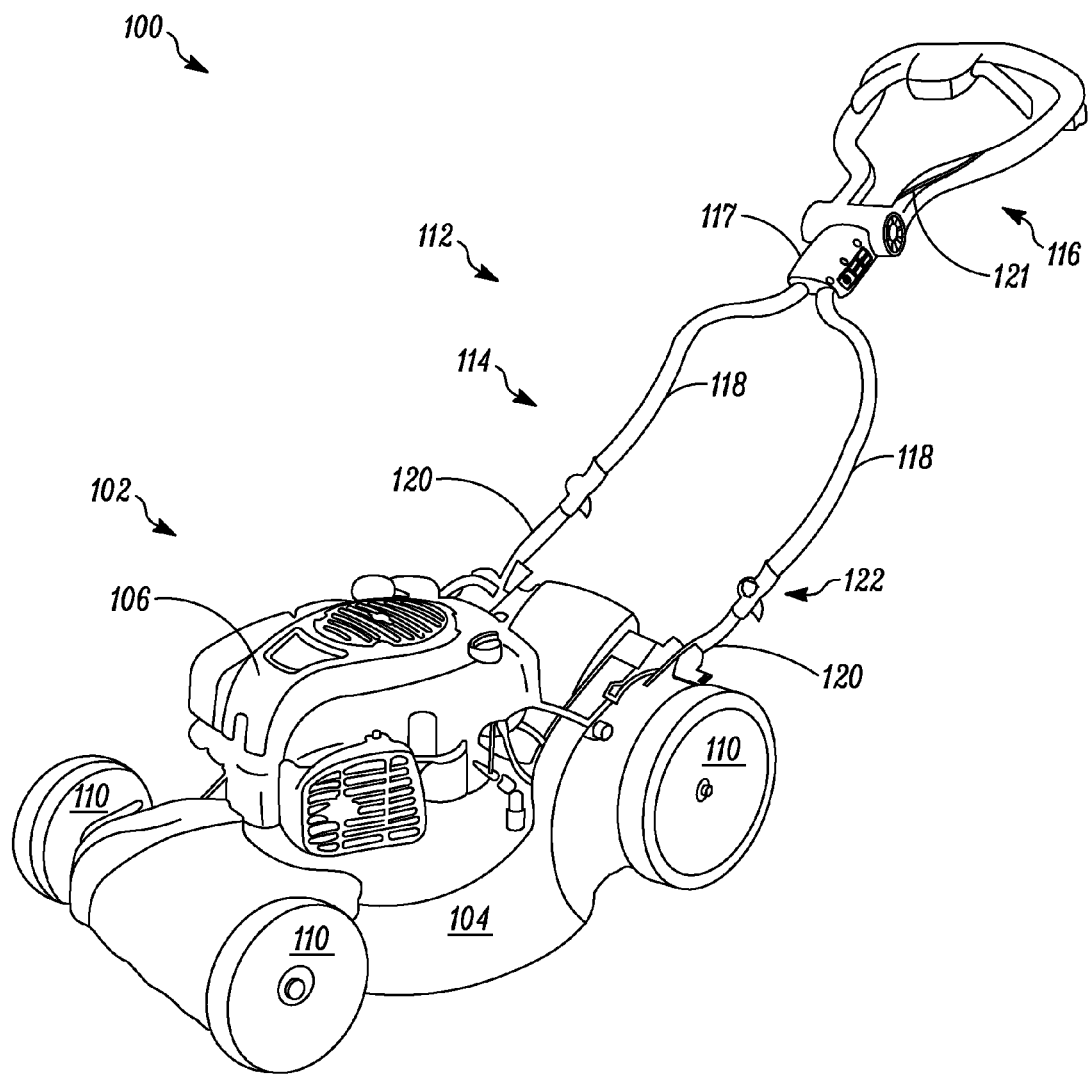
FIG. 1 is a perspective view of a walk-behind power tool, according to an embodiment of the present invention.

The present invention will be described more fully hereinafter with reference to the accompanying drawings, in which preferred embodiments of the invention are shown. This invention may, however, be embodied in many different forms herein; rather, these embodiments are provided so that this disclosure will be thorough and complete, and will fully convey the scope of the invention to those skilled in the art. In the drawings, like numbers refer to like references.

FIG. 1 is a perspective view of a walk-behind power tool 100 according to an embodiment of the present invention. As illustrated in FIG. 1, the walk-behind power tool 100 is a walk-behind lawn mower. However, the walk-behind power tool 100 may be any type of walk-behind power tool, for example, but not limited to, a snow thrower, a dethatcher, an aerator, a sod cutter, or the like.

As illustrated in FIG. 1, the walk-behind power tool 100 includes a body 102 having a housing 104 and a prime mover 106. The prime mover 106 is supported on the housing 104 and is configured to drive a working member (not shown). Though the prime mover 106, as illustrated in FIG. 1, is an internal combustion engine, the prime mover 106 may be an electric motor, or any other type of actuator within the scope of the present invention. The electric motor may be driven by an external power source or an onboard battery. Further, a transmission assembly (not shown) may be provided between the prime mover 106 and the working member. In an embodiment, the housing 104 may form a cutting deck and encloses the working member. Moreover, the height of the working member relative to the ground may be adjustable. The working member may be a cutting blade. However, in various embodiments, the working member may include a filament cutter, one or more tines, an auger, a rotary saw etc. The working member may also be positioned outside the housing 104 at any position. One more auxiliary members, such as, a blower, may also be provided on the body 102.

As illustrated in FIG. 1, ground engaging wheels 110 are provided to support the body 102 and enable movement of the walk-behind power tool 100. In some embodiments, the prime mover 106 may also drive two or more wheels 110 via a drive assembly. Moreover, the height of each wheel 110 relative to the ground may be adjustable. Further, a collection box (not shown) may be provided to the rear of the body 102 to collect cut vegetation, thatch, or the like. Alternatively, the collection box may be provided at any position with respect to the body 102, for example, at one of the sides.

As illustrated in FIG. 1, a handle assembly 112 is provided at the rear of the body 102 to enable a user to operate the walk-behind power tool 100 while walking. The handle assembly 112 includes a lower handle portion 114 and an upper handle portion 116. The lower handle portion 114 is connected to the body 102 while the upper handle portion 116 is configured to be gripped by a user. The lower handle portion 114 and the upper handle portion 116 may be connected to each other via a coupling mechanism 117. Further, the upper handle portion 116 includes various control members (not shown), such as, triggers, switches, levers, bail handle etc. As illustrated in FIG. 1, the lower handle portion 114 includes first elongate members 118 connected to corresponding second elongate members 120. The first elongate members 118 are connected to the upper handle portion 116 while the second elongate members 120 are connected to the body 102. Further, at least one of the first elongate members 118 includes a channel or a groove (not shown) such that at least one cable harness 121, associated with the control members, may pass through the first elongate member 118. Similarly, the corresponding second elongate member 120 also includes a channel or a groove such that a cable harness 121 may also pass through the second elongate member 120. The cable harness 121 may be protected from mechanical damage and/or exposure to hostile environmental conditions by being at least partially enclosed within the first elongate member 118 and the second elongate member 120. Further, this also prevents a loose and exposed portion of the cable harness 121 from getting entangled with any object and interfering with an operation of the walk-behind power tool 100.

The cable harness 121 may connect one or more actuators (E.g., valves, interlock switches, or the like) of the walk-behind power tool 100 with one or more control members located in the upper handle portion 116. In an embodiment, the cable harness 121 may include a Bowden cable assembly to enable mechanical actuation of the one or more actuators. In an alternative embodiment, the cable harness 121 may include an electrical cable assembly for electric actuation of the one or more actuators. This may enable the user to conveniently control one or more operational parameters (E.g., speed of the working member, activation or deactivation of the prime mover 106 etc.) of the walk-behind power tool 100 while gripping the upper handle portion 116. Moreover, each first elongate member 118 is pivotally connected to the corresponding second elongate member 120 via a folding arrangement 122 (described in detail in conjunction with FIG. 2).

It may be apparent to a person ordinarily skilled in the art that the details of the walk-behind power tool 100, as illustrated in FIG. 1, is purely exemplary in nature, and the walk-behind power tool 100 may have any alternative configuration or design within the scope of the present invention. For example, the upper handle portion 116 may be connected to each first elongate member 118 separately via two couplers. Alternatively, the upper handle portion 116 may be absent. In such case, the first elongate members 118 may extend upwards and are joined to each other to enable the user to grip the handle assembly 112.

Figure 2:
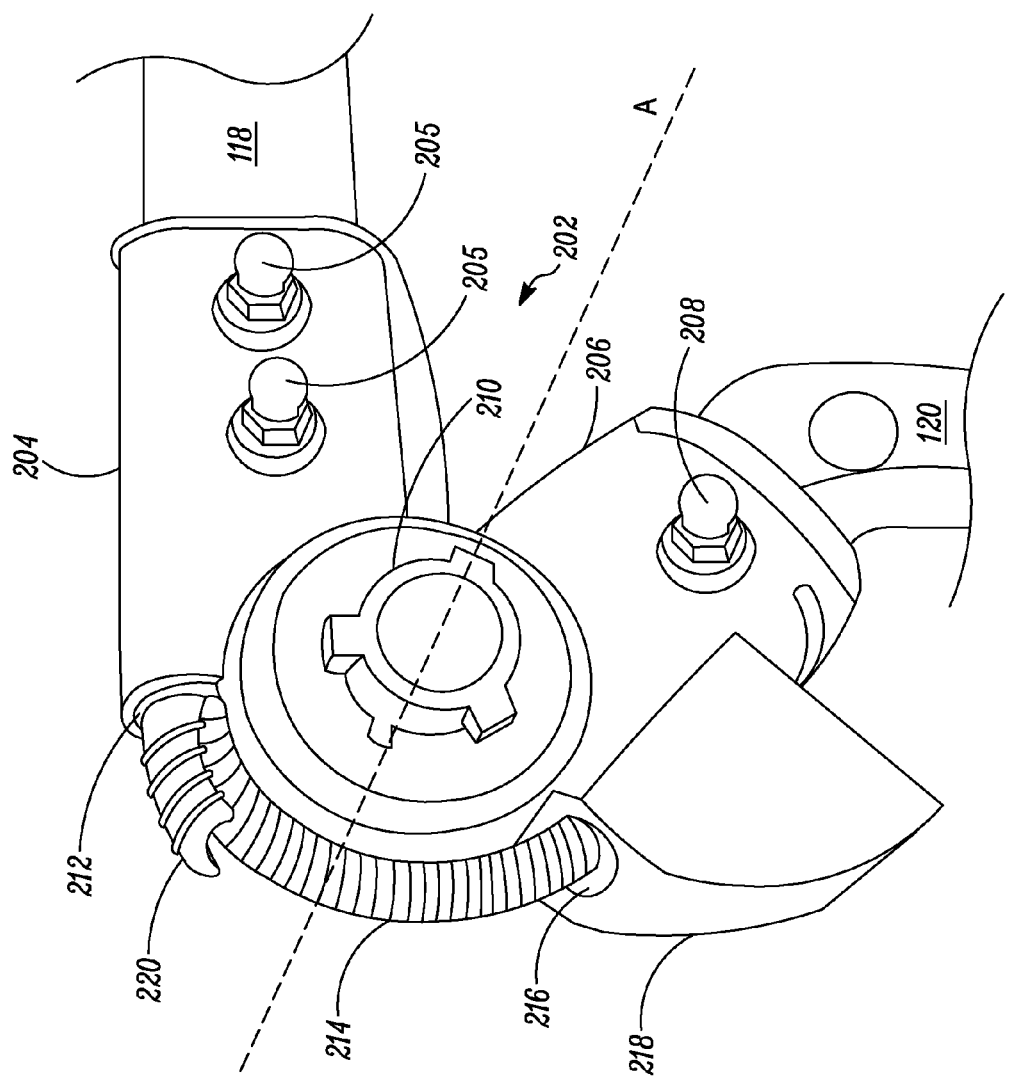
FIG. 2 is a perspective view of a folding arrangement of the walk-behind power tool, according to an embodiment of the present invention.

FIG. 2 is a perspective view of the folding arrangement 122, according to an embodiment of the present invention. The folding arrangement 122 includes a hinge 202. The hinge 202 includes a first hinge part 204 which is configured to receive an end of the first elongate member 118. The first elongate member 118 is attached to the first hinge part 204 by one or more fasteners 205. However, the first elongate member 118 may be attached to the first hinge part 204 by any other means, for example, adhesives, welding, or the like. The hinge 202 further includes a second hinge part 206 which is configured to receive an end of the second elongate member 120. The second hinge part 206 is connected to the second elongate member 120 by one or more fasteners 208. Moreover, the first hinge part 204 and the second hinge part 206 are pivotally interconnected about a hinge axis A in order to enable pivotal movement of the hinge 202 between a closed position (illustrated in FIG. 1) and a folded position (illustrated in FIG. 2) of the folding arrangement 122. In the closed position, the first elongate member 118 and the second elongate member 120 are aligned substantially in a straight line, thereby enabling the user to operate the walk-behind power tool 100. Conversely, in the folded position, the first elongate member 118 is inclined at an angle relative to the second elongate member 120. Further, the first elongate member 118 is inclined towards the body 102 of the walk-behind power tool 100 along with the upper handle portion 116. Thus, in the folded position, a space occupied by the walk-behind power tool 100 is less than that in the closed position. The folded position may correspond to a storage configuration and/or a transport configuration of the walk-behind power tool 100 because of compactness.

In an embodiment, the first hinge part 204 and the second hinge part 206 may be normally locked relative to one another in the closed position or the folded position. Further, an actuating member 210 may have to be displaced from a locked position to an unlocked position so that the first hinge part 204 and the second hinge part 206 may be moved relative to one other about the hinge axis A. Moreover, the actuating member 210 may be rotatable from the locked position to the unlocked position. Alternatively, the actuating member 210 may need to be pressed in order to move the actuating member 210 to the unlocked position. After adjustment of the first hinge part 204 and the second hinge part 206 (to the closed position or the folded position), the actuating member 210 is displaced back to the locked position. Additionally, the first hinge part 204 and the second hinge part 206 may include intermeshing projections in order to lock them relative to one other. When the actuating member 210 is moved to the unlocked position, the projections (not shown) may get disengaged such that the first hinge part 204 and the second hinge part 206 are movable relative to one other.

As illustrated in FIG. 2, the first hinge part 204 includes a first opening 212 which is arranged for the cable harness 121 (not shown in FIG. 2), coming from the first elongate member 118, to pass through. Further, the cable harness 121 is covered by a flexible tubular cable harness protection means 214

(hereinafter referred to as "the protection means 214"). Similarly, the second hinge part 206 includes a second opening 216 arranged for receiving the cable harness 121 coming from the first opening 212. The second opening 216 may be provided in a projecting section 218 of the second hinge part 206 for proper alignment of the first opening 212 and the second opening 216 in the closed position. In the exemplary embodiment, as illustrated in FIG. 2, the first opening 212 and the second opening 216 has a curvilinear shape. However, the first opening 212 and the second opening 216 may be of any shape or dimensions within the scope of the present invention. Further, the protection means 214 extend between the first opening 212 and the second opening 216. Moreover, as illustrated in FIG. 2, the protection means 214 is a coil spring. However, in other embodiments of the present invention, the protection means 214 may be a deformable sheath.

The first opening 212 and the second opening 216 face each other when the hinge 202 is in the closed position, and the cable harness 121 is substantially hidden within the first hinge part 204 and the second hinge part 206. Further, both the cable harness 121 and the protection means 214 are substantially straight following the arrangement of the first hinge part 204 and the second hinge part 206. However, in the folded position, as illustrated in FIG. 2, the first opening 212 and the second opening 216 are angularly separated such that cable harness 121 and the protection means 214 become angularly shaped and exposed. The protection means 214 may safeguard the cable harness 121 against mechanical damage, exposure to detrimental environmental elements, or the like.

Further, as illustrated in FIG. 2, the first hinge part 204 includes a protruding portion 220. In another embodiment, a protruding portion (not shown) may be provided on the second hinge part 206 instead of the first hinge part 204. In an alternative embodiment, the second hinge part 206 may include a second protruding portion (not shown) in addition to the first hinge portion 204 having the protruding portion 220. As illustrated in FIG. 2, the protruding portion 220 is provided at the periphery of the first opening 212. Similarly, in case the second hinge part 206 includes a protruding portion, the protruding portion may be provided at the periphery of the second opening 216. Further, in the closed position of the hinge 202, the protruding portion 220 is substantially enclosed within the first hinge part 204 and the second hinge part 206. In case both the first hinge part 204 and the second hinge part 206 includes protruding portions, the protruding portions may be configured such that they are in a superimposed relationship relative each other in the closed position of the hinge 202. The first opening 212 and the second opening 216 may also have suitable dimensions in order to accommodate the protection means 214 surrounding the cable harness 121 as well as the protruding portion 220 in the closed position. Further, the protruding portion 220 may be a separate component attached to the first hinge part 204 by adhesives, fasteners, welding, or the like. Alternatively, the protruding portion 220 may be integrally formed with the first hinge part 204.

Further, the protruding portion 220 is configured to direct the cable harness 121 towards the first opening 212 and the second opening 216 when the hinge 202 is pivoted from the folded position to the closed position. The protruding portion 220 may have sufficient rigidity to resist deformation when the cable harness 121 and the protection means 214 is pressed against the protruding portion 220 during pivoting of the hinge 202 from the folded position to the closed position. Moreover, the protruding portion 220 may have a curved cross-section to conform to the shape of the cable harness 121 and the protection means 214. Thus, the protruding portion 220 substantially prevents undesired deformation and entanglement of the cable harness 121 between the first hinge part 204 and the second hinge part 206. This prevents any damage to the cable harness 121 during pivoting of the hinge 202, thereby resulting in smooth operation of the hinge 202. Therefore, the hinge 202 enables the use of the folding arrangement 122 in conjunction with the handle assembly 112 having the cable harness 121 at least partially enclosed within at least the first elongate member 118 and the second elongate member 120.

The hinge 202, as illustrated in FIG. 2, is for exemplary purpose only, and the hinge 202 may be of any alternate configuration within the scope of the present invention. For example, there may be multiple cable harnesses running through the first elongate member 118 and the second elongate member 120. In such case, the protection means 214 may cover all the cable harnesses, or individual protection means 214 may be provided for each cable harness. Further, in various embodiments of the present invention, the protection means 214 may not be present. Additionally, various components of the hinge 202, including the first hinge part 204, the second hinge part 206, and the protruding portion 220, may be made of any material, for example, metal, plastic, or the like.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A folding arrangement of a walk-behind power tool, the folding arrangement comprising
   a hinge, having a first hinge part arranged for receiving an end of a first elongate member, and a second hinge part arranged for receiving an end of a second elongate member, the first and second hinge parts being pivotally interconnected about a hinge axis, so as to enable pivoting of the hinge between a folded position and a closed position,
   wherein the first hinge part has a first opening arranged for passing through a cable harness arriving from a channel or groove provided in the first elongate member,
   wherein the second hinge part has a second opening arranged for receiving the cable harness arriving from the first opening,
   wherein the first and second openings are facing each other when the hinge is in the closed position, and
   wherein at least one of the first and second hinge parts has a protruding portion, arranged for directing the cable harness towards the first and second openings upon pivoting the hinge from the folded position to the closed position.

2. The folding arrangement according to claim 1, wherein the protruding portion is arranged at a periphery of the first opening.

3. The folding arrangement according to claim 2, wherein a second protruding portion is arranged at a periphery of the second opening.

4. The folding arrangement according to claim 1, which folding arrangement furthermore comprises a flexible tubular cable harness protection means, arranged to extend between the first opening and the second opening and to cover the cable harness between the first opening and the second opening.

5. The folding arrangement according to claim 4, wherein the flexible tubular cable harness protection means is a coil spring.

6. The folding arrangement according to claim 4, wherein the flexible tubular harness protection means is a deformable sheath.

7. The folding arrangement according to claim 1, wherein, when the hinge is in the closed position, the protruding portion is substantially enclosed within the first hinge part or the second hinge part.

8. The folding arrangement according to claim 1, wherein the protruding portion comprises a curved cross-section to conform to the shape of the cable harness when the hinge is in the folded position.

9. The folding arrangement according to claim 1, wherein the protruding portion comprises a rigidity sufficient to resist deformation of the protruding portion by the cable harness during pivoting of the hinge from the folded position to the closed position.

10. The folding arrangement according to claim 1, wherein the second opening is provided in a projecting system of the second hinge part.

11. A handle assembly of a walk-behind power tool, the handle assembly comprising a folding arrangement, the folding arrangement comprising:
- a hinge comprising a first hinge part arranged for receiving an end of a first elongate member, and a second hinge part arranged for receiving an end of a second elongate member, the first and second hinge parts being pivotally interconnected about a hinge axis, so as to enable pivoting of the hinge between a folded position and a closed position,
- wherein the first hinge part has a first opening arranged for passing through a cable harness arriving from a channel or groove provided in the first elongate member,
- wherein the second hinge part has a second opening arranged for receiving the cable harness arriving from the first opening,
- wherein the first and second openings are facing each other when the hinge is in the closed position, and
- wherein at least one of the first and second hinge parts has a protruding portion, arranged for directing the cable harness towards the first and second openings upon pivoting the hinge from the folded position to the closed position.

12. The handle assembly according to claim 11, wherein the folding arrangement further comprises a flexible tubular cable harness protection means, arranged to extend between the first opening and the second opening and to cover the cable harness between the first opening and the second opening, and
- wherein the flexible tubular harness protection means is a deformable sheath.

13. The handle assembly according to claim 11, wherein, when the hinge is in the closed position, the protruding portion is substantially enclosed within the first hinge part or the second hinge part.

14. The handle assembly according to claim 11, wherein the protruding portion comprises a curved cross-section to conform to the shape of the cable harness when the hinge is in the folded position.

15. The handle assembly according to claim 11, wherein the protruding portion comprises a rigidity sufficient to resist deformation of the protruding portion by the cable harness during pivoting of the hinge from the folded position to the closed position.

16. The handle assembly according to claim 11, wherein the second opening is provided in a projecting system of the second hinge part.

17. A walk-behind power tool comprising a handle assembly, a working member, and a prime mover configured to drive the working member, the handle assembly comprising a folding arrangement, the folding arrangement comprising:
- a hinge comprising a first hinge part arranged for receiving an end of a first elongate member, and a second hinge part arranged for receiving an end of a second elongate member, the first and second hinge parts being pivotally interconnected about a hinge axis, so as to enable pivoting of the hinge between a folded position and a closed position,
- wherein the first hinge part has a first opening arranged for passing through a cable harness arriving from a channel or groove provided in the first elongate member,
- wherein the second hinge part has a second opening arranged for receiving the cable harness arriving from the first opening,
- wherein the first and second openings are facing each other when the hinge is in the closed position, and
- wherein at least one of the first and second hinge parts has a protruding portion, arranged for directing the cable harness towards the first and second openings upon pivoting the hinge from the folded position to the closed position.

18. The walk-behind power tool of claim 17, wherein the walk-behind power tool is a snow thrower, dethatcher, aerator, or sod cutter.

19. The walk-behind power tool of claim 17, wherein the walk-behind power tool is a lawn mower, and wherein the working member comprises a cutting blade.

20. The walk-behind power tool of claim 17, wherein the working member comprises a filament cutter, one or more tines, an auger, or a rotating saw.

* * * * *